(12) United States Patent
Rohde et al.

(10) Patent No.: US 6,604,598 B1
(45) Date of Patent: Aug. 12, 2003

(54) FUEL TANK FOR AUTOMOBILES WITH FUEL CELL DRIVE

(75) Inventors: Wolfgang Rohde, Speyer (DE); Knut Oppenländer, Ludwigshafen (DE); Markus Hölzle, Kirchheim (DE); Eckhard Sausen, Rudersberg (DE)

(73) Assignees: Basell Polyolefine GmbH, Wesseling (DE); BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/806,144

(22) PCT Filed: Oct. 12, 1999

(86) PCT No.: PCT/EP99/07662
§ 371 (c)(1),
(2), (4) Date: Mar. 28, 2001

(87) PCT Pub. No.: WO00/21772
PCT Pub. Date: Apr. 20, 2000

(30) Foreign Application Priority Data

Oct. 13, 1998 (DE) .......................... 198 46 895

(51) Int. Cl.$^7$ .............................. B60R 21/00
(52) U.S. Cl. .................. 180/271; 180/274; 220/562; 280/735; 280/834
(58) Field of Search .................. 180/271, 274; 280/728.1, 735, 830, 834; 220/562; 206/219

(56) References Cited

U.S. PATENT DOCUMENTS

| 3,804,292 A | 4/1974 | Chiti |
| 4,536,188 A | 8/1985 | de Witt |

FOREIGN PATENT DOCUMENTS

| DE | 2006929 | * 9/1971 | .................. 280/834 |
| GB | 2 215 685 | 9/1989 | |

OTHER PUBLICATIONS

Hightech Report, '98, Daimler Benz AG, 10–15.

* cited by examiner

*Primary Examiner*—Eric Culbreth
(74) *Attorney, Agent, or Firm*—Keil & Weinkauf

(57) ABSTRACT

A fuel tank for motor vehicles which is connected to a supplementary tank containing a flame-coloring additive, where a data recorder causes, in the event of a fault signal, the flame-coloring additive to be added to the fuel tank from the supplementary tank, and a process for adding a flame-coloring additive to the fuel in a fuel tank.

4 Claims, 1 Drawing Sheet

FUEL TANK FOR AUTOMOBILES WITH FUEL CELL DRIVE

Figure 1:
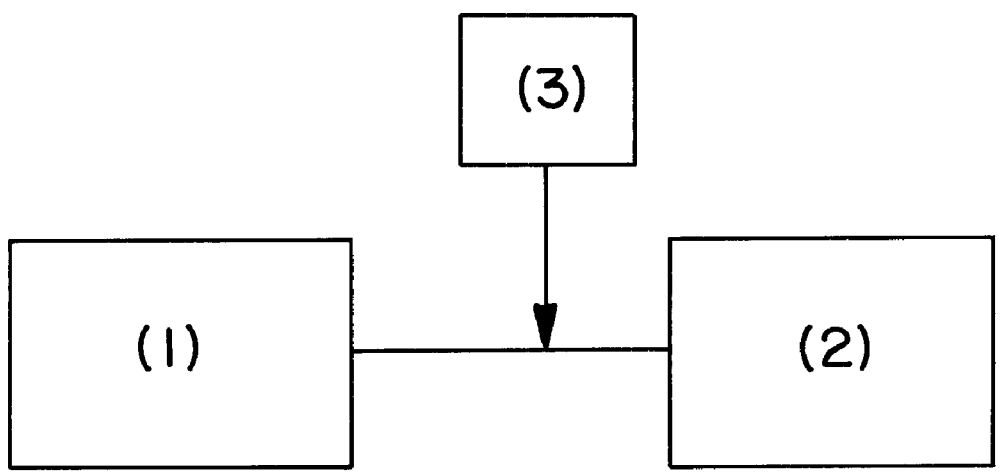

The present invention relates to a fuel tank for motor vehicles which is connected to a supplementary tank containing a flame-coloring additive, where a data recorder causes, in the event of a fault signal, the flame-coloring additive to be added to the fuel tank from the supplementary tank, and to a process for adding a flame-coloring additive to the fuel in the fuel tank.

Fuel cell driven motor vehicles either contain a storage tank for hydrogen or firstly generate hydrogen from alcohols by means of a reforming catalyst and then use this hydrogen in a second step in the actual fuel cell to generate electric current for driving the vehicle (see, for example, "Hightech Report '98", Daimler Benz AG, Public Relations, 70546 Stuttgart). The latter vehicles, like those driven by conventional internal-combustion engines, require fuel tanks to hold the liquid fuel. However, the alcohols used as fuel, especially methanol and ethanol, burn with a pale bluish or virtually invisible flame, in contrast to gasoline or diesel fuels. This property of alcohols represents a considerable safety risk for the operation of motor vehicles having fuel cells. If the tank is damaged in an accident and the alcohol escapes and ignites, the alcohol flame can remain undetected. People in the vicinity are therefore exposed to considerable risk due to combustion or explosions. In addition, extinguishing work is made more difficult.

It is therefore necessary to add flame-coloring additives to fuels for fuel cell driven motor vehicles in order to ensure that flames are seen easily and rapidly. Flame-coloring additives are known in principle. For example, alcohol flames can be colored, for example, using alcohol-soluble compounds of the alkali and alkaline earth metals and in particular using boron compounds. Addition of just 0.2% by weight of ethyl borate ensures an intensely green flame. It is also possible to use unsaturated organic compounds, such as aromatics, which tend to form soot and burn with a luminous flame.

However, a disadvantage of such additives is that, even at low concentrations, they completely or partially poison or reduce the life of the reforming catalyst which precedes the fuel cell. In addition, some of the additives (for example aromatics) have a toxicity problem, which means that broad use thereof is not readily possible.

FIG. 1 is a schematic drawing of the invention.

It is an object of the present invention to find a way of adding flame-coloring additives to fuels for fuel cell driven motor vehicles which does not have the abovementioned disadvantages.

We have found that this object is achieved by a fuel tank (1) which is connected to a supplementary tank (2) containing a flame-coloring additive, where a data recorder (3) causes, in the event of a fault signal generated by accidents or hazardous operating states of the vehicle, the flame-coloring additive to be added to the fuel tank (1) from the supplementary tank (2), and by a process for adding a flame-coloring additive to the fuel in a fuel tank.

The novel fuel tank is made of materials known to the person skilled in the art and suitable for fuel tanks, for example plastics, such as high density polyethylene (HDPE), polyketone (PK), polyamide (PA), multilayer composite plastic materials or steel or aluminum. Preference is given to HDPE or steel. These said plastic composite materials are preferably those based on HDPE with a barrier layer of fluorinated polyethylene, ethylene-vinyl alcohol copolymer (EVOH) or polyamide. The outer shape is advantageously matched perfectly, by methods known to the person skilled in the art, to the vehicle in which the tank is to be installed. In accordance with the invention, the fuel tank is connected to a supplementary tank containing a flame-coloring additive. The supplementary tank may be installed inside or outside the fuel tank or in its wall. It is preferably installed in the fuel tank. The supplementary tank can have any suitable shape. The supplementary tank is sealed so that the fuel and flame-coloring additive do not mix with one another during normal operation of the vehicle. The volume of the supplementary tank is small compared to the volume of the fuel tank. In general, the volume is not more than 10% of the volume of the fuel tank. The pressure in the interior of the supplementary tank may correspond to the external pressure or may be higher. The internal pressure in the supplementary tank can be matched to the respective design in a suitable manner by the person skilled in the art. In general, however, the internal pressure in the supplementary tank is not more than 10 bar.

The novel fuel tank also contains a data recorder which causes, in the event of a fault signal, the flame-coloring additive to be added to the fuel tank from the supplementary tank. The data recorder comprises sensors which can record fault signals generated by accidents or hazardous operating states of the vehicle. Examples of such events are collisions of the vehicle with a barrier, collisions with another vehicle, overturning, fire, excessive temperature in the tank or sudden deceleration of the vehicle. In a preferred embodiment, the sensor is the sensor already present in motor vehicles of the prior art for triggering the airbag, which can advantageously also be used for the novel purpose. It is also possible to use a plurality of data recorders, which can react to different fault signals, optionally interconnected by a logic circuit.

The data recorder causes, in the event of a fault signal, the flame-coloring additive to be added to the fuel tank from the supplementary tank. The data recorder controls a device which breaks, opens, punctures or cracks the supplementary tank, allowing the additive to enter the fuel tank and mix with the fuel.

The device can consist, for example, of one or more tensioned bolts which are released by the sensor and break or puncture the supplementary tank. The device can also comprise, for example, a valve which opens a connection between the supplementary tank and the fuel tank, allowing the flame-coloring additive to exit. In this case, it is advantageous for the supplementary tank to be under pressure.

Although an active, sensor-controlled device is preferred, the present invention also covers, however, devices for breaking the supplementary tank by means of passive mechanics, for example a pendulum impact mechanism of suitable design which uses the impact energy occurring as a consequence of the change in momentum in the event of an accident to break the supplementary tank.

A suitable material for the supplementary tank is selected depending on the device used to add the flame-coloring additive to the fuel tank. Examples of suitable materials are in principle glass, ceramics, metals, for example steel or aluminum, or plastics. It is also selected so that the material is compatible with the flame-coloring additive and the fuel and is not swollen by the fuel. In devices which break the supplementary tank, it is preferred to use a material which has good fracture behavior, i.e. is easily broken by an impact. Examples of suitable materials are glass and ceramics.

The flame-coloring additive is preferably liquid or is used in the form of a solution, in particular an alcoholic solution. Suitable alcoholic solvents are, for example, methanol, ethanol and isopropanol, or mixtures thereof. Suitable flame-coloring additives essentially consist, for example, of trimethyl borate, triethyl borate, boric acid, sodium ethoxide, sodium methoxide, benzene, toluene, xylene, and solutions of higher aromatics. It is also possible to use mixtures for various flame-coloring additives.

The amount of flame-coloring additive in the supplementary tank is set so that good flame coloring is achieved even if the fuel tank is full. In general, the supplementary tank contains from 0.1 to 5% by weight, preferably from 0.3 to 1% by weight, based on the fuel.

A vehicle equipped with the novel fuel tank has the advantage that the flame-coloring additive only reaches the fuel in the event of an accident. In an advantageous embodiment of the invention, the flame-coloring additive is added to the fuel only when an event occurs which also triggers the airbag. This prevents the reforming catalyst being poisoned in normal vehicle operation. In addition, general use of additives in the fuel is avoided, thus reducing fuel costs.

We claim:

1. A fuel tank for motor vehicles which is connected to a supplementary tank containing a flame-coloring additive, where a data recorder causes, in the event of a fault signal generated by accidents or hazardous operating states of the vehicle, the flame-coloring additive to be added to the fuel tank from the supplementary tank.

2. A fuel tank as claimed in claim 1, wherein the data recorder is a sensor which also triggers a vehicle's airbag.

3. A fuel tank as claimed in claim 1, which is made of a material containing a plastic, steel or aluminum, and the supplementary tank containing the flame-coloring additive is made of a material containing plastic, steel, aluminum, glass or ceramic.

4. A motor vehicle containing a fuel tank as claimed in claim 1.

* * * * *